P. BRUNER.
NUT AND BOLT LOCK.
APPLICATION FILED APR. 20, 1911.
1,036,069.
Patented Aug. 20, 1912.
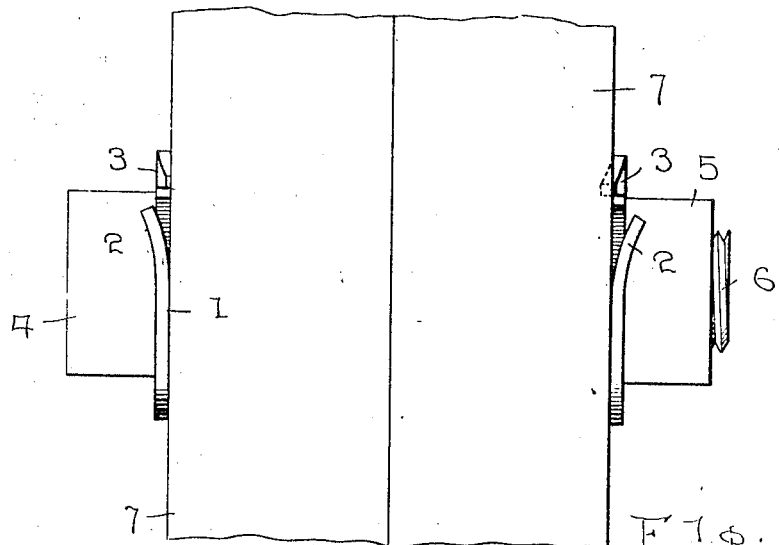
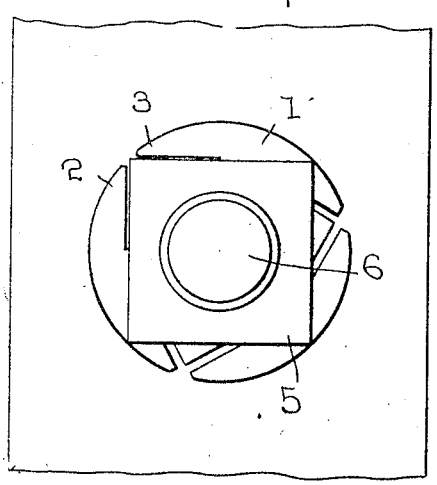
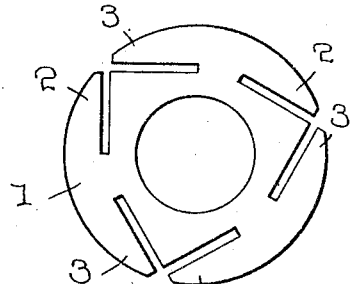
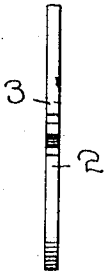 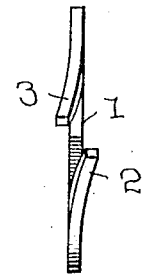
WITNESSES:
INVENTOR
P. Bruner
BY
W. J. FitzGerald
Attorneys

UNITED STATES PATENT OFFICE.

PHILIP BRUNER, OF BOISE, IDAHO.

NUT AND BOLT LOCK.

1,036,069.  Specification of Letters Patent.  Patented Aug. 20, 1912.

Application filed April 20, 1911. Serial No. 622,347.

*To all whom it may concern:*

Be it known that I, PHILIP BRUNER, a citizen of the United States, residing at Boise, in the county of Ada and State of Idaho, have invented certain new and useful Improvements in Nut and Bolt Locks; and I do hereby declare the following to be a full, clear, and exact description of the invention, such as will enable others skilled in the art to which it appertains to make and use the same.

This invention relates to nut and bolt locks and more particularly to that class of nut and bolt locks known as washer nut and bolt locks.

An object of the invention is to provide a washer nut and bolt lock which may be applied to any nut and bolt in use and which may be used wherever there is space enough for the bolt or nut to turn.

Another object of the invention is to provide a washer nut and bolt lock of simple construction, which may be manufactured at a cost not to exceed the cost of manufacturing the ordinary washer.

Another object is to provide a washer nut and bolt lock which may be manufactured with the same dies now employed to manufacture the ordinary washer by simply altering the face of the dies to form slots in and near the edge of said washer.

Another object is to provide a nut and bolt lock of this character, which may be applied either to the nut or bolt head and which will lock the nut or bolt head, to which it is applied, against rotation and may also be locked in engagement with the adjacent surface to prevent the washer itself from rotating.

Another object is to provide a nut and bolt lock of the above stated character, which may be employed upon rail joints, machinery, both large and small, wagons, etc., and in fact, wherever bolts and nuts are used, and, Another object is to provide a nut and bolt lock of this nature, which may be employed to lock the bolt or nut in any position without having to rotate the nut or bolt one-half or one-fourth of a revolution.

Other objects and advantages will be hereinafter set forth and pointed out in the specification and claim.

In the accompanying drawings which are made a part of this application, Figure 1 shows my improved washer nut and bolt lock employed to lock both the head of the bolt and the nut upon the opposite end of the bolt, the bolt being shown as employed for bolting together two blocks. Fig. 2 is a side elevation at right angles to Fig. 1, showing the washer before the prongs thereof have been bent to lock the nut and washer against rotation. Fig. 3 is a detail view of the washer. Fig. 4 is an edge view of the washer, and Fig. 5 is a view similar to Fig. 4, showing the opposite locking prongs bent in opposite directions, as indicated in Fig. 1.

Referring to the drawings in which similar reference numerals designate corresponding parts throughout the several views, 1 shows the washer, which is preferably in circular form, but may be, if desired, made square or any other shape. The washer is provided at intervals along its edge with slots at right angles, forming opposite prongs 2 and 3. As illustrated, the washer is provided with three sets of slots, forming three prongs No. 2 and a similar number of prongs No. 3. The number of slots, however, is not essential as any number may be provided, the essential feature being the positioning of the slots at right angles to one another to form the prongs 2 and 3, the slots being continued to the edge of the washer, cutting away a small triangular portion at the junction of the slots, making it easier to operate upon the ends of the prongs 2 and 3.

As shown in the drawings, the washer is placed under the bolt head 4, or the nut 5. If desired, the washers may be used for both the head of the bolt and the nut upon the opposite end of the bolt, or it may be used for only one of these purposes, the other end of the securing device being held against rotation by being countersunk in the work, or other material. The nut 5 is screwed tightly upon the bolt 6, to draw the pieces of work 7 closely together and the head 4 of the bolt against the washer 1, or the work 7, as the case may be.

The nut is rotated until one of its corners is directly over one of the sets of slots, which should occur in such numbers as to make it necessary to only rotate the nut 5 a short distance to bring one of its corners over one of the sets of slots. When the bolt is in proper position, the prong 2, adjacent the above mentioned corner, is bent upwardly against the side of the bolt to prevent the latter from rotating in either direction. The prong 3 is then forced into the work or adjacent material. This will prevent any rotation of the washer. Thus it will be seen that it will be impossible for either the washer or the locking nut to rotate in any direction and that they will be securely locked together, as well as being locked to the work or material through which the bolt is secured.

If one of the locking washers is used for the head of the bolt, the prongs are bent in the same manner as described in connection with the nut, locking the bolt in a similar manner against rotation as well as locking the washer used therewith against movement independently of the work or material, within which its prong 3 has been forced. It will be understood that should a securing means having a squared portion adjacent the head thereof be used, it will be unnecessary to use one of these locking washers in connection with the head, as the securing member will be held against rotation independently of the work or other material through which each passes by means of its squared portion fitting within a similarly shaped opening in the material.

It will be readily seen that the above described nut and bolt locking washer may be manufactured at the same price as the ordinary washer, on account of the only change or alteration being the slots within the material, said locking washer thereby requiring no more material than the ordinary washer. It will also be seen that this washer may be used wherever a bolt and nut is used for the reason that it requires no more space than does the nut, and the prongs of said washer may be easily bent, as above described, by any ordinary tool employed for such purposes without the necessity of reaching the washer with the head of a hammer or other means to pound upon said prongs. It will also be evident to persons familiar with such devices, that the dies now employed for manufacturing the ordinary washer may be altered to cut the slots, as above described, to produce my nut and bolt locking washer. Thus, it will be unnecessary to incur an extra expense of making special dies to manufacture the herein described washer. This washer may be used upon any machinery, either large or small, at railway crossings, and upon vehicles and in fact wherever bolts and nuts, or similar securing devices, are employed.

What I claim is:

A nut or bolt locking means, comprising a washer having triangularly arranged right angled slots at intervals extending inwardly from its edge to form angularly disposed prongs one of said prongs to be bent against the side of the bolt head or nut while the adjacent prong is to be forced into the adjacent material to lock said washer and nut against rotation.

In testimony whereof I have signed my name to this specification in the presence of two subscribing witnesses.

PHIL. BRUNER.

Witnesses:
 L. H. Cox,
 E. W. Cuff.